United States Patent
Clark

(10) Patent No.: US 6,977,049 B2
(45) Date of Patent: Dec. 20, 2005

(54) TREATMENT PROCESS FOR INDUSTRIAL WASTE STREAM

(75) Inventor: James Robert Clark, Phoenix, AZ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/749,950

(22) Filed: Dec. 31, 2003

(65) Prior Publication Data

US 2005/0139554 A1    Jun. 30, 2005

(51) Int. Cl.[7] ............................................... C02F 1/72
(52) U.S. Cl. ..................... 210/763; 210/908; 588/317; 588/320; 423/283
(58) Field of Search ............................... 210/758, 763, 210/908; 588/317, 320; 423/283

(56) References Cited

U.S. PATENT DOCUMENTS

| | | | |
|---|---|---|---|
| 3,338,726 A | 8/1967 | Berzins | |
| 4,240,909 A | 12/1980 | Manziek | |
| 4,877,450 A | 10/1989 | Brasch | |
| 5,454,930 A | 10/1995 | Miura et al. | |
| 5,709,841 A * | 1/1998 | Reimer | 423/283 |
| 5,788,821 A | 8/1998 | Itabashi et al. | |
| 5,883,762 A | 3/1999 | Calhoun et al. | |
| 5,924,047 A * | 7/1999 | Gold et al. | 588/317 |
| 6,001,762 A | 12/1999 | Harmer et al. | |
| 6,372,147 B1 * | 4/2002 | Reimer | 210/759 |
| 6,790,364 B2 * | 9/2004 | Wang et al. | 210/668 |
| 2002/0169331 A1 | 11/2002 | Miura et al. | |
| 2003/0085177 A1 | 5/2003 | Dubin et al. | |
| 2003/0180463 A1 | 9/2003 | Saito | |

* cited by examiner

Primary Examiner—Matthew O. Savage
(74) Attorney, Agent, or Firm—David A. Hey; Mary K. Nicholes

(57) ABSTRACT

A process for treating an industrial waste stream containing a borane compound including contacting the industrial waste stream with a resin carrying an oxidation catalyst that is capable of oxidizing the borane compound to boric acid.

29 Claims, No Drawings

TREATMENT PROCESS FOR INDUSTRIAL WASTE STREAM

FIELD OF THE INVENTION

The present invention relates to a process for treating an industrial waste stream, such as a semiconductor manufacturing waste stream, to remove a borane compound, and converting the borane compound to another chemical species.

BACKGROUND

Electroless plating, also known as electroless deposition, is a process for depositing a layer of a conductive material, such as a metal, from a plating solution onto a substrate without the application of electrical current.

Electroless plating is commonly used in the semiconductor processing industry to deposit or "plate" a layer of a conductive metal from a plating solution onto a semiconductor wafer. Electroless plating solutions often include a reducing agent which reduces the metal in the plating solution to cause the metal to be deposited or to "plate out" over the target surface of a substrate, such as the semiconductor wafer.

Electroless plating processes involve the use of solutions or "baths" of chemicals, including, for example, metals and reducing agents. The used electroless plating solutions typically contain residual amounts of these chemicals, thereby presenting waste disposal problems. Consequently, the electroless plating waste solutions have been found to be capable of generating flammable hydrogen gas after they have been discarded. The source of hydrogen gas appears to be attributed to the reduction of water by the reducing agents in the plating solution.

Therefore, it is desirable to treat or remove the reducing agents, such as dimethylamine borane, from the electroless plating waste solutions prior to disposal of the used plating solutions.

Prior processes for removing reducing agents, such as dimethylamine borane, from an electroless semiconductor plating process either did not utilize a catalyst or did utilize a liquid acid catalyst. For processes that do not utilize a catalyst, the rate of oxidation of dimethylamine borane was extremely slow. For processes that utilize liquid acid catalysts, specialized injection and mixing equipment is required.

SUMMARY

A process is provided for treating an industrial waste stream containing a borane compound comprising contacting the industrial waste stream with a resin carrying an oxidation catalyst that is capable of oxidizing said borane compound to boric acid.

The process for treating an industrial waste stream containing a borane compound may include mixing the industrial waste stream with a resin carrying an oxidation catalyst, where mixing includes one of (i) simultaneously mixing the industrial waste stream with an organic solvent in the presence of the resin, or (ii) mixing the industrial waste stream with an organic solvent to form a solution, followed by mixing the solution with the resin.

The process for treating an industrial waste stream containing a borane compound may include mixing the industrial waste stream with an organic solvent to form a solution containing the industrial waste and passing the solution containing the industrial waste stream through a vessel containing the resin.

DETAILED DESCRIPTION

A process is provided for treating an industrial waste stream containing a borane compound. The process includes contacting the industrial waste stream containing the borane compound with a resin carrying an oxidation catalyst that is capable of oxidizing said borane compound to boric acid.

For purposes of the specification, the term "oxidation catalyst" refers to a chemical compound or moiety that catalyzes the oxidation of the borane compound or compounds contained in an industrial waste stream.

For purposes of the specification, the phrases "a resin that carries an oxidation catalyst" and "a resin carrying an oxidation catalyst" may be used interchangeably. Accordingly, the phrases "a resin material that carries an oxidation catalyst" and "a resin material carrying an oxidation catalyst" both refer to a resin material incorporating an oxidation catalyst, or that has an oxidation catalyst associated therewith. Without limitation, the oxidation catalyst may be chemically bonded to the resin material, or may be attached to the resin material through physical interactions.

The process for treating an industrial waste stream containing a borane compound may include simultaneously mixing the industrial waste stream containing the borane compound with an organic solvent in the presence of the resin carrying the oxidation catalyst. Alternatively, the process for treating an industrial waste stream containing borane compound may include mixing the industrial waste stream with an organic solvent to form a solution, followed by mixing the solution with the resin carrying the oxidation catalyst to form a slurry.

In another embodiment, the process for treating an industrial waste stream containing a borane compound may include mixing the industrial waste stream with an organic solvent to form a solution, and passing the solution containing the borane compound through a vessel containing a resin carrying an oxidation catalyst.

According to the process, the industrial waste stream containing the borane compound is mixed with an organic solvent selected from a ketone, an aldehyde, a mixture of at least one ketone and at least aldehyde, a mixture of at least one ketone and at least one alcohol, a mixture of at least one aldehyde and at least one alcohol and a mixture of at least one ketone, at least one aldehyde and at least one alcohol.

The industrial waste stream may be contacted with a ketone selected from, without limitation, acetone, dihydroxyacetone, fructose, dextrose, sucrose, and mixtures thereof.

The industrial waste stream may be contacted with an aldehyde alone, or an aldehyde in combination with a ketone. Without limitation, the aldehydes that may be utilized in the process include formaldehyde, acetaldehyde, glyoxal, glyoxylic acid and mixtures thereof.

If the industrial waste stream is contacted with a mixture of a ketone and an alcohol, or a mixture of an aldehyde and an alcohol, then the alcohol that may be utilized in the mixture may be selected from water soluble alcohols such as methanol, ethanol, n-propanol, isopropanol, ethylene glycol, propylene glycol, glycerol, and mixtures thereof.

In certain embodiments, prior to contacting the industrial waste stream with the resin carrying the oxidation catalyst, the industrial waste stream is mixed with a ketone to form a solution. A particularly useful ketone for this purpose is acetone.

The industrial waste stream, or the solution of the industrial waste stream and the organic solvent, is then contacted with the resin carrying the oxidation catalyst. In general, the resin may be a polymeric resin. However, it should be noted that any material that is capable of functioning as an adsorption resin and is capable of incorporating an oxidation catalyst may be utilized in the present process.

The resin preferably comprises a polymeric material. Suitable polymeric materials that may comprise the resin include any polymeric resin that is capable of functioning as an adsorption resin and is capable of carrying or incorporating an oxidation catalyst that is capable of oxidizing a borane to boric acid. A preferred polymer resin that may be utilized in the present process comprises a styrene-based material, such as, without limitation, a styrene-divinylbenzene resin.

The resin carries or incorporates an oxidation catalyst for the oxidation of the reducing agents in the industrial waste stream, such as a waste stream from the semiconductor electroless plating process. An oxidation catalyst is any chemical moiety that catalyzes the oxidation of a first chemical species to a second chemical species. For example, the oxidation catalyst may be any chemical moiety that catalyzes the oxidation of a borane compound to boric acid. The oxidation catalyst may include an acid functionality group. Without limitation, the acid functionality may comprise an organo moiety having a sulfo radical, namely, $R—SO_2OH$, that is, a sulfonic acid.

A useful acid-functionalized resin for this purpose is a commercially available ion exchange resin from The Dow Chemical Company sold under the trade name DOWEX M31. DOWEX M31 ion exchange resins are hard, opaque monospheres of a styrene-divinylbenzene matrix carrying a sulfonic acid functionality.

In certain embodiments, a process is provided for treating an industrial waste stream containing a borane compound that includes contacting an industrial waste stream with a separation medium, such as, for example, an adsorption resin to extract the borane compound from the industrial waste stream. Once the borane compound has been extracted from the industrial waste stream, it is then contacted with a resin carrying an oxidation catalyst.

The process can be used to convert dimethylamine borane extracted from an industrial waste stream or from an adsorption medium to boric acid by acidic oxidation and hydrolysis. The conversion of the of dimethylamine borane to boric acid by acidic oxidation and hydrolysis is represented by the following chemical equation:

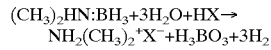

wherein X is an acid moiety.

In certain embodiments, dimethylamine borane may be converted to boric acid by acidic oxidation and hydrolysis by passing a waste stream containing dimethylamine borane through a separation resin carrying sulfuric acid functionality. The conversion of dimethylamine borane by sulfuric acid oxidation and hydrolysis proceeds in accordance with the following equation:

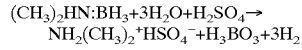

The present process for treating the industrial waste stream from the semiconductor plating solution may be carried out at ambient temperature.

The present process contacting may be carried out for at least 2 minutes to complete the extraction of the borane compounds from the resin and to oxidize the extracted borane compounds.

While the solution and process may be utilized to extract a variety of chemical species from industrial waste streams and convert various chemical compounds using various separation media, the process finds applicability in the extraction and conversion of reducing agents that are used in an electroless plating process in the semiconductor processing industry from the waste stream. The process may be utilized to extract and oxidize a reducing agent, such as dimethylamine borane, from a waste stream using an acid-functionalized adsorption resin. As the dimethylamine borane contacts the adsorption resin, it is converted by oxidation to boric acid and other chemical by-products.

EXAMPLES

The following example is set forth to further illustrate a certain embodiment of the process. The example should not be construed as limiting the process in any manner.

Treatment of Cobalt Electroless Plating Solution

A cobalt electroless plating solution was prepared by combining together 30 grams of $CaCl_2 \cdot 6H_2O$, 57 grams of citric acid monohydrate, and 50 grams of $NH_4Cl$. The combined ingredients were diluted to 400 ml with deionized water. To this solution, 315 ml of 25% aqueous tetramethylammonium hydroxide (TMAH) having a pH of 8.05 was added. 2 grams of ammonium hypophosphite and 20 grams of dimethylamine borane (DMAB) was added to the solution. Finally, 115 ml of TMAH was added to the solution, and the solution was diluted to 1 liter with deionized water.

A 300 ml column was packed with an adsorption separation resin. 250 ml of the cobalt electroless plating solution prepared above was poured into the top of the resin-packed column and was allowed to flow through the column by gravity. After pouring the cobalt plating solution into the column, 500 ml of deionized water, followed by 250 ml of a regeneration solution comprising 10 percent acetone by volume in isopropanol were sequentially poured into the top of the resin packed column. Shortly after the introduction of the regeneration solution into the column, 750 ml of deionized water was poured into the top of the resin-packed column. Eight fractions of eluent were collected from the bottom of the resin-packed column over the course of a 40 minute time period.

After the collection of the fractions was complete, 100 ml of the DOWEX M31 resin was measured in a graduated cylinder and transferred to a 250 ml bottle. 100 ml of fraction 6 was also measured in a graduated cylinder. The 100 ml sample of fraction 6 was combined in the bottle with the 100 ml of DOWEX M31 resin to prepare a slurry. The slurry was stirred with a glass rod. After 1 minute of stirring the slurry, a 2 ml sample of the supernatant liquid was decanted into a sample vial. After an additional 2 minutes of stirring, a second 2 ml sample was decanted. An additional sample was taken after 5 total minutes of stirring the slurry. The samples were evaluated by boron NMR, which confirmed the absence of DMAB in the test sample.

The oxidation of DMAB by contacting a waste stream containing DMAB with a resin carrying an acidic oxidation catalyst functionality was evaluated. A waste stream containing DMAB was passed through a column packed with a polymeric adsorption resin. Acetone was passed through the adsorption resin-packed column in order to extract DMAB from the resin and samples were collected. Samples containing DMAB were contacted with a resin containing an oxidation catalyst comprising an acidic functionality, namely, a sulfonic acid functionality for different time periods, namely, 1 minute, 2 minutes or 5 minutes. These examples were evaluated against the results of comparative examples 1 and 2, which were acetone solution containing DMAB that were not contacted with the resin carrying an acidic oxidation catalyst. The results are set forth in Table I below.

TABLE I

| Example | Treatment | Time Elapsed Since Elution (hrs) | % DMAB Remaining |
|---|---|---|---|
| 1 (comparative) | Acetone Only | 3 | 19% |
| 2 (comparative) | Acetone Only | 7 | 3% |
| 3 | Acetone + Resin (1 min) | 3 | 1% |
| 4 | Acetone + Resin (1 min) | 7 | 1% |
| 5 | Acetone + Resin (2 min) | 3 | 0% |
| 6 | Acetone + Resin (2 min) | 7 | 0% |
| 7 | Acetone + Resin (5 min) | 3 | 0% |
| 8 | Acetone + Resin (5 min) | 7 | 0% |

Samples were analyzed at two different times for the presence of DMAB, namely, 3 hours after elution from the adsorption resin-packed column and 7 hours after elution. The results shown in Table I above demonstrate that contacting an industrial waste stream containing a borane compound, such as DMAB, with a resin carrying an acidic oxidation catalyst results in the efficient oxidation DMAB to boric acid.

The regeneration solution and process can be used to treat a wide variety of spent electroless plating solutions containing reducing agents, such as, for example, nickel electroless plating solutions, cobalt electroless plating solutions, and copper electroless plating solutions.

The present process efficiently and cost-effectively extracts borane compounds from spent semiconductor electroless plating solutions. The process also quickly oxidizes the extracted borane species to boric acid. In fact, the rate of oxidation of dimethylamine borane to boric acid by the present process is about 300 times faster than the rate of the uncatalyzed oxidation reaction. The present process is also advantageous over prior processes in that special injection and mixing equipment is not required, as is required for use of liquid acid catalysts.

It will be understood that the embodiments described herein are merely exemplary and that a person skilled in the art may make many variations and modifications without departing from the spirit and scope of the invention. All such variations and modifications are intended to be included within the scope of the invention as described herein. It should be understood that any embodiments described above are not only in the alternative, but can be combined.

I claim:

1. A process for treating an industrial waste stream containing a borane compound comprising contacting the industrial waste stream with a resin carrying an oxidation catalyst that is capable of oxidizing said borane compound to boric acid.

2. The process of claim 1 wherein said contacting includes mixing the industrial waste stream with the resin.

3. The process of claim 2 wherein said contacting includes one of the following: (i) simultaneously mixing the industrial waste stream with an organic solvent and the resin, or (ii) mixing the industrial waste stream with an organic solvent to form a solution, followed-by mixing the solution with the resin.

4. The process of claim 3 wherein the organic solvent is selected from the group consisting of at least one ketone, at least one aldehyde, a mixture of at least one ketone and at least one alcohol, a mixture of at least one aldehyde and at least one alcohol, a mixture of at least one ketone, at least one aldehyde and at least one alcohol, a mixture of at least one ketone, at least one alcohol and water, a mixture of at least one aldehyde, at least one alcohol and water, and a mixture of at least one ketone, at least one aldehyde, at least one alcohol and water.

5. The process of claim 4 wherein the at least one ketone is selected from the group consisting of acetone, dihydroxyacetone, fructose, dextrose, sucrose and mixtures thereof.

6. The process of claim 4, wherein the at least one aldehyde is selected from the group consisting of formaldehyde, acetaldehyde, glyoxal, glyoxylic acid and mixtures thereof.

7. The process of claim 4 wherein the at least one alcohol is selected from the group consisting of methanol, ethanol, n-propanol, isopropanol, ethylene glycol, propylene glycol, glycerol, and mixtures thereof.

8. The process of claim 4 wherein the organic solvent is a ketone.

9. The process of claim 8 wherein the ketone is acetone.

10. The process of claim 4 wherein the organic solvent is a mixture of a ketone and an alcohol.

11. The process of claim 10 wherein the ketone is acetone and the alcohol is isopropanol.

12. The process of claim 3 wherein the oxidation catalyst includes a sulfonic acid group.

13. The process of claim 1 wherein the resin is a polymeric resin.

14. The process of claim 13 wherein the polymeric resin is a styrene-divinylbenzene resin.

15. The process of claim 13 wherein the organic solvent is selected from the group consisting of at least one ketone, at least one aldehyde, a mixture of at least one ketone and at least one alcohol, a mixture of at least one aldehyde and at least one alcohol, a mixture of at least one ketone, at least one aldehyde and at least one alcohol, a mixture of at least one ketone, at least one alcohol and water, a mixture of at least one aldehyde, at least one alcohol and water, and a mixture of at least one ketone, at least one aldehyde, at least one alcohol and water.

16. The process of claim 15 wherein the at least one ketone is selected from the group consisting of acetone, dihydroxyacetone, fructose, dextrose, sucrose and mixtures thereof.

17. The process of claim 15 wherein the aldehydes are selected from the group consisting of formaldehyde, acetaldehyde, glyoxal, glyoxylic acid and mixtures thereof.

18. The process of claim 15 wherein the at least one alcohol is selected from the group consisting of methanol, ethanol, n-propanol, isopropanol, ethylene glycol, propylene glycol, glycerol, and mixtures thereof.

19. The process of claim 15 wherein the organic solvent is a ketone.

20. The process of claim 19 wherein the ketone is acetone.

21. The process of claim 1 wherein the oxidation catalyst includes a sulfonic acid group.

22. The process of claim 1 wherein said contacting includes mixing the industrial waste stream with an organic solvent to form a solution containing the industrial waste and passing the solution containing the industrial waste through a vessel containing the resin.

23. The process of claim 22 wherein the resin is a polymeric resin.

24. The process of claim 23 wherein the polymeric resin is a styrene-divinylbenzene resin.

25. The process of claim 22 wherein the oxidation catalyst includes a sulfonic acid group.

26. The process of claim 1 wherein the borane compound is dimethylamine borane.

27. The process of claim 26 wherein the dimethylamine borane is oxidized to boric acid.

28. The process of claim 26 wherein said contacting is carried out for at least 2 minutes.

29. The process of claim 1 wherein said contacting is carried out at ambient temperature.

* * * * *

UNITED STATES PATENT AND TRADEMARK OFFICE
CERTIFICATE OF CORRECTION

PATENT NO.       : 6,977,049 B2
APPLICATION NO. : 10/749950
DATED            : December 20, 2005
INVENTOR(S)      : James Robert Clark Page 1 of 1

It is certified that error appears in the above-identified patent and that said Letters Patent is hereby corrected as shown below:

At Column 4, line 26

Delete "CaCl2" and insert -- CoCl2 --

Signed and Sealed this

Third Day of March, 2009

JOHN DOLL
*Acting Director of the United States Patent and Trademark Office*